Jan. 10, 1961  K. GEBELE  2,967,472
PRESELECTION DIAPHRAGM STRUCTURE FOR PHOTOGRAPHIC CAMERAS
Filed Sept. 27, 1956  2 Sheets-Sheet 1

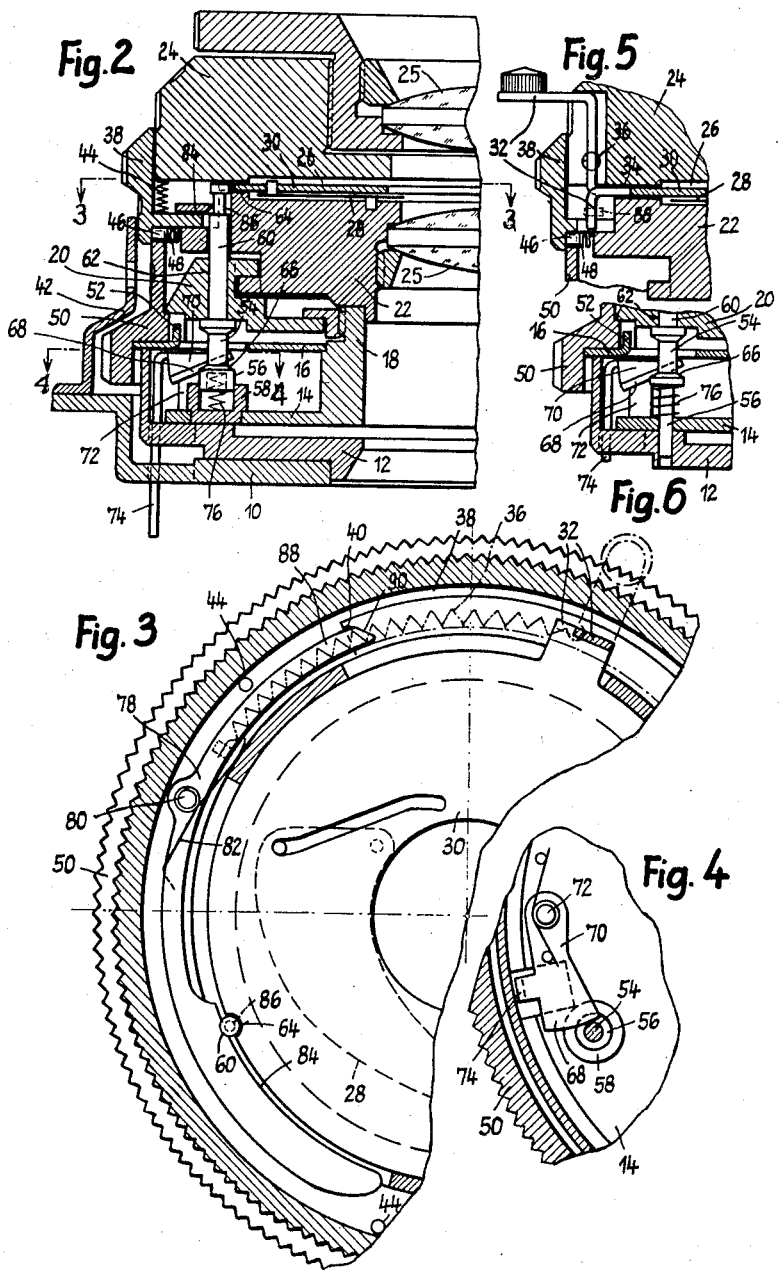

United States Patent Office 2,967,472
Patented Jan. 10, 1961

2,967,472

PRESELECTION DIAPHRAGM STRUCTURE FOR PHOTOGRAPHIC CAMERAS

Kurt Gebele, Munich, Germany, assignor, by mesne assignments, to Compur-Werk Friedrich Deckel OHG., Munich, Germany, a firm of Germany Filed Sept. 27, 1956, Ser. No. 612,465

Claims priority, application Germany Sept. 29, 1955

2 Claims. (Cl. 95—64)

This invention relates to a preselection diaphragm for photographic cameras of the type in which the diaphragm is in an interchangeable lens unit detachable from and replaceable on a shutter unit.

In certain types of cameras, particularly single lens reflex cameras, it is desirable to have the shutter blades and the diaphragm leaves fully open to their respective maximum apertures, when focusing the camera, access of light to the film being prevented at this time by suitable means such as the reflex mirror. When focusing is completed and the picture is to be taken, the shutter blades are closed prior to moving the mirror to picture-taking position, and it is desirable to close down the diaphragm leaves to a previously determined or previously selected aperture, before the shutter blades are again opened to make the actual exposure. Hence a diaphragm of this kind may be referred to as a preselection diaphragm, meaning that after the diaphragm leaves have been opened to maximum aperture for focusing, they are closed down again to the previously selected aperture, before the picture is taken, without further special attention on the part of the operator.

An object of the invention is the provision of a generally improved and more satisfactory structure of this kind.

Another object is the provision of diaphragm mechanism mounted in an interchangeable unit and coupled by simple means to a shutter unit on which the interchangeable unit is mounted, the coupling means being so constructed that the diaphragm is moved to its preselected position before the shutter blades are opened to make the exposure.

Still another object is the provision of coupling means between the interchangeable unit and the shutter unit, so designed that the coupling means becomes fully effective for its intended purpose, no matter in what position or condition the diaphragm may happen to be at the time that the interchangeable unit carrying the diaphragm is mounted on the shutter unit.

These and other desirable objects may be attained in the manner disclosed as an illustrative embodiment of the invention in the following description and in the accompanying drawings forming a part hereof, in which:

Fig. 2 is a fragmentary radial section through a portion of the camera body, the shutter unit, and the interchangeable lens and diaphragm unit, the section being taken along the optical axis;

Fig. 3 is a fragmentary section through the same, taken perpendicular to the optical axis approximately on the line 3—3 of Fig. 2;

Fig. 4 is a fragmentary transverse section approximately on the line 4—4 of Fig. 2;

Fig. 5 is a fragmentary radial section similar to a portion of Fig. 2 but taken on a different radius, illustrating additional details; and Fig. 6 is a view similar to a fragment of Fig. 2, illustrating a slightly modified construction.

The same reference numerals throughout the several views indicate the same parts.

Figure 1:
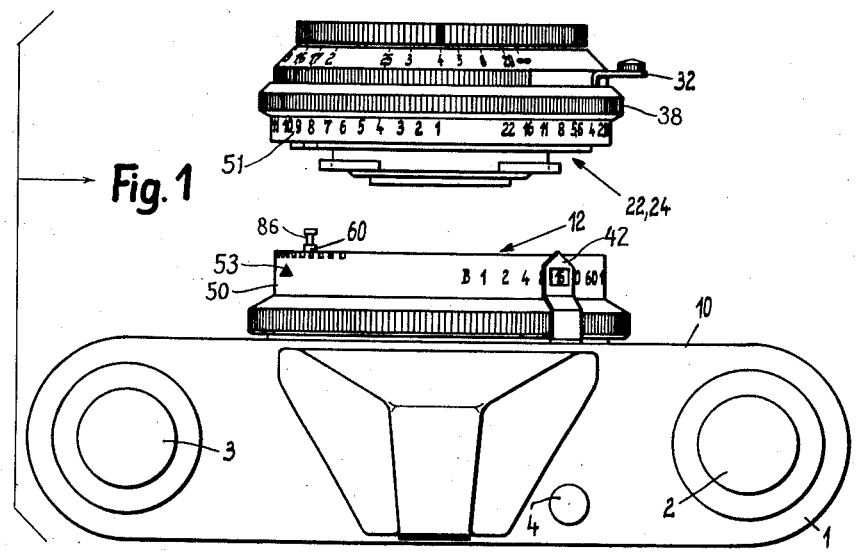
Fig. 1 is a plan of a camera equipped with a shutter unit and an interchangeable lens and diaphragm unit, the latter unit being shown slightly separated from the shutter unit in a position assumed when being placed on or taken off of the shutter unit.

Referring first to Fig. 1, there is shown a photographic camera having a main body 1 of suitable known construction, including a film winding or advancing knob 2, a film rewinding knob 3, and a release plunger or trigger 4.

Referring now to Figs. 2 and 3 in addition to Fig. 1, the front wall 10 of the camera has attached to it the usual casing or housing 12 of an objective shutter, of generally annular cylindrical shape, the annular space within the housing containing the usual base plate or mechanism mounting plate 14 of annular form, from the inner circumference of which the front threaded tube 18 extends forwardly. The shutter speed setting ring 16 is rotatable on the outside of the tube 18 near the forward end thereof, so as to turn about the optical axis of the shutter as a center, and the turning of this speed setting ring 16 serves to adjust the time of exposure in the usual known manner, controlling the speed at which the shutter operating mechanism within the annular part of the shutter housing opens and closes the usual shutter blades mounted in the space just behind the base plate 14. The details of construction of the shutter mechanism, except for the points specifically mentioned below, are not important for purposes of the present invention and may be of any suitable known form.

Fastened to the front of the tube 18 is a stationary bayonet connection ring 20 which serves also as a cover for the front end of the shutter, overlying the shutter speed adjusting ring 16. The ring 20 has at its front end the usual bayonet connection lugs or flanges which mate with bayonet connection lugs or flanges near the rear end of the interchangeable lens and diaphragm unit, which unit is made up of the two main parts 22 and 24 fastened to each other and serving to carry the usual lens elements or components 25, one or both of which may be mounted for axial movement for focusing purposes. In the particular construction here shown, the forward one of the lenses 25 is mounted in a screw threaded sleeve which, upon being rotated by the milled ring at the front of the unit, travels axially forwardly or rearwardly for focusing purposes.

In the space 26 between the two housing parts 22 and 24 of the interchangeable unit, there is mounted a diaphragm or stop comprising the usual iris diaphragm leaves or blades 28, adjusted by an adjusting ring 30 rotatable about the optical axis as a center. The ring has an outwardly extending arm 32 passing through a slot 34 and divided into two parts, one of which extends axially rearwardly a short distance as seen in Fig. 5, the other of which extends forwardly and thence radially outwardly through an arcuate slot to a finger piece by which it can be actuated to adjust the diaphragm.

Movement of the ring 30 and arms 32 in a clockwise direction, when viewed as in Fig. 3, serves to open the diaphragm leaves 28 to a larger aperture, while counterclockwise rotation closes down the aperture of the diaphragm. A spring 36 extending circumferentially and connected at one end to the arm 32 and at the other end to a fixed pin in the housing, tends constantly to turn the ring 30 in a counterclockwise direction and thus to close down the diaphragm aperture, to an extent permitted by engagement of the arm 32 with a radially extending abutment surface 40 on the external diaphragm setting ring 38 which is rotatable circumferentially on the interchangeable lens unit body 22, 24. The periphery of the ring 38 carries the usual diaphragm aperture scale which is read in conjunction with the stationary pointer 42.

In addition to its rotary movement (about the optical axis as a center) for adjusting the preselected aperture of the diaphragm, the setting ring 38 is also displaceable in an axial direction to a limited extent, and is constantly urged rearwardly by the action of springs 44, so as to keep a coupling tooth 46 on the ring 38 in engagement with one or another of the coupling notches 48 formed at the front edge of the externally accessible speed setting ring 50 which is coupled to the internal shutter speed setting ring 16 to turn therewith, by means of a driving tooth 52 on the ring 16, engaging in a notch of the ring 50. Thus there is a detachable coupling between the diaphragm setting ring 38 and the shutter speed setting ring 16, 50, which coupling can be set to various different relative positions of orientation, in accordance with different exposure values to be used when taking pictures under various different conditions of lighting, filter factor, film speed, etc. An exposure value scale 51 is preferably marked circumferentially on the ring 38, in addition to the diaphragm aperture scale, and is read in connection with a reference point or index mark 53 on the speed adjusting ring 50, so that this scale 51 will show the relative positions of the diaphragm aperture and shutter speed adjustments with respect to each other, regardless of the absolute position of either one of them. This variable coupling of the diaphragm aperture adjustment to the shutter speed adjustment, and the use of exposure value scale in connection therewith, are disclosed, for example, in my copending United States patent application, Serial No. 507,703, filed May 11, 1955 (now Patent 2,887,940, granted May 26, 1959), to which reference is made for such further details as may be desired, although an understanding of further details is not necessary to an understanding of the present invention.

When the camera is to be focused in advance of taking the picture, the diaphragm adjusting ring 30 is turned all the way in a clockwise direction to open the diaphragm to maximum aperture, and according to the present invention it is latched in this open position by mechanism best shown in Figs. 2 and 3. A latching pin 54, extending parallel to the optical axis, is mounted in the shutter housing for limited axial movement and has its enlarged rear end 56 engaged in a cylindrical guide 58 in a fixed position in the shutter housing, and constantly pressed forwardly by a spring 76. The front end portion 60 of the latching pin projects through a bore 62 in the bayonet connection ring 20 which is stationarily mounted on the front of the shutter, and through an arcuate slot (concentric with the optical axis) in the body portion 22 of the interchangeable lens unit, the extreme front end of the latching pin engaging in a latching notch 64 formed in the edge of the diaphragm aperture adjusting ring 30 when this ring is in its position corresponding to maximum aperture opening of the diaphragm. When the pin 54 is withdrawn rearwardly, the aperture adjusting ring 30 can be turned circumferentially, but if the latching pin is not otherwise restrained it will snap forwardly (under the influence of its spring 76) into the notch 64 whenever the aperture adjusting ring 30 reaches its position of maximum aperture, thereby latching the diaphragm in fully open position.

Near the rear end of the pin 54, within the shutter casing, there is a forwardly faced conical shoulder 66 arranged to engage with and be pressed rearwardly by an oblique cam surface 68 of a release pawl 70 pivotally supported in the shutter housing 12 on the pivot pin 72 (Figs. 2 and 4) so as to swing in a plane perpendicular to the optical axis. The pawl 70 has a lug or arm 74 which extends rearwardly parallel to the optical axis, out the back of the shutter casing and through the front wall 10, to a position within the camera body, where it is suitably connected to the release plunger 4 of the camera in such manner that when the release plunger is depressed to make the exposure, the arm or lug 74 is moved radially inwardly toward the optical axis so as to swing the pawl 70 in a counterclockwise direction on its pivot 72. This movement causes the oblique cam edge 68 of the pawl to react with the conical shoulder 66 of the latching pin 54 to move the latching pin axially rearwardly against the force of its spring 76. Also, near the end of the complete stroke of the pawl 70, this movement of the pawl serves to release or trigger the shutter to open and close the blades to make an exposure, the details of the shutter mechanism itself being unimportant for purposes of the present invention, so that it is sufficient for present purposes merely to understand that the shutter is released or triggered near the end of the counterclockwise swinging movement of the pawl 70.

On the front surface of a radially extending flange of the diaphragm setting ring 38, a double armed pawl 78 is pivotally mounted at 80 and is influenced by a spring 82 tending to swing the pawl counterclockwise on its pivot. The rear arm 84 of the pawl normally engages in a constriction or reduced neck portion 86 near the front end of the latching pin 54, 60, while the other arm 88 of the pawl has an oblique cam surface 90 lying just a little ahead (in a clockwise direction) of the abutment shoulder 40, so that as the arm 32 of the diaphragm adjusting ring 30 swings counterclockwise under the influence of its spring 36, it will engage the cam surface 90 and turn the pawl 78 just before the motion of the arm 32 is stopped by engagement with the abutment 40. This engagement of the arm 32 with the cam 90 will swing the pawl 78 clockwise on its pivot 80, to a sufficient extent to disengage the other arm 84 of the pawl from the reduced neck portion 86 of the pin 54, 60.

This embodiment of the invention operates as follows: On the basis of existing illumination conditions, film speed, and filter factor (if any), the operator sets the diaphragm aperture adjusting ring 38 in the desired position of orientation relative to the shutter speed setting ring 50, by moving the ring 38 forwardly against the force of its spring 44, to uncouple the tooth 46 from the notch 48 and place it in any other desired notch 48, until the proper exposure value of the scale 51 is opposite the reference mark 53. Then the desired diaphragm aperture at which the photograph is to be taken is preselected by turning the ring 38 to bring the desired absolute value of the diaphragm aperture on its scale, opposite the stationary pointer 42, this adjusting motion of the diaphragm aperture preselecting ring 38 serving at the same time to turn the shutter speed adjusting ring 50 (because of the coupling between the two rings) in a complementary manner, so that the exposure value is not changed.

In order now to be able to effect optical focusing of the camera, in the case of a single-lens reflex camera, both the diaphragm leaves or blades and the shutter blades must be opened. The opening of the shutter blades for focusing purposes is effected in a known manner the details of which are not important for purposes of the present invention, the mechanism not being shown in the drawings. In order to open the diaphragm leaves to maximum aperture for focusing, the diaphragm adjusting ring 30 is turned by means of the external finger piece on the arm 32, in a clockwise direction when viewed as in Fig. 3, until the front end of the latching pin 54, 60 snaps into the recess 64 in the diaphragm ring 30, under the influence of the spring 76.

Digital pressure on the finger piece of the arm 32 may now be released, as the latching pin 54, 60 will hold the diaphragm adjusting ring 30 in the fully open position, as long as desired. When focusing is completed and the operator is ready to take the picture, he depresses the release plunger 4 on the camera body which moves the arm 74 to swing the pawl on its pivot 72. By the interaction of the oblique surfaces 68 and 66, this draws the latching pin 54, 60 rearwardly far enough to release the diaphragm ring 30, so that the spring 36 may begin to move the diaphragm ring in a counterclockwise direction to close down the aperture of the diaphragm to the preselected value. However, the engagement of the end 84 of the pawl 78 in the reduced neck 86 of the latching pin, serves to prevent the latching pin from being withdrawn all the way rearwardly at this time, and thus prevents the pawl 70 from completing its stroke far enough to trip or release the shutter mechanism.

Just before the diaphragm adjusting ring 30 reaches the preselected position, the arm 32 engages the oblique cam end 90 of the pawl 78 and swings this pawl to release the other end 84 from the neck portion 86 of the latching pin 54, 60. The latching pin may now be moved further rearwardly, to the end of its stroke, so that the pawl 70 (previously blocked by the intermediate position of the latching pin) is now able to complete its stroke, in the latter part of which it trips or releases the shutter mechanism to operate the shutter to open and close the shutter blades to make the exposure.

Thus when the operator places his finger on the release plunger 4 and presses downwardly to take the picture, there is a momentary dwell or stoppage at an intermediate point of the downward movement of the release plunger. The movement cannot be completed, sufficiently to trip the shutter, until the diaphragm has closed down to the preselected aperture and it is the closing movement of the diaphragm aperture which releases the shutter tripping parts so that these parts may complete their movement and trip the shutter. In this way, there is absolute assurance that the effective shutter actuation will not take place until the diaphragm has assumed the preselected aperture position.

It will also be noted that this construction is extremely simple and inexpensive, and is also designed in such a way that it does not interfere with placing the interchangeable lens and diaphragm unit on the camera, or taking it off the camera, regardless of the position in which the diaphragm may be set at the moment. As already mentioned, the pin 54, 60 extends through an arcuate slot in the part 22 of the interchangeable unit, and this arcuate slot is long enough to accommodate the pin during the necessary turning movement of the interchangeable unit while engaging or disengaging the bayonet lugs on the interchangeable unit and on the shutter, respectively. If the interchangeable unit happens to be engaged with the shutter while the diaphragm is stopped down to an aperture smaller than its maximum aperture, the axial part of the engaging motion will simply cause the ring 30 to engage the end of the pin 54, 60 and push the pin rearwardly, and the front end of the pin will ride on the rear face of the plate 30 until the next adjusting movement of the diaphragm to maximum aperture, when the pin will snap forwardly into the notch 64.

A slight variation of essentially the same construction is illustrated in Fig. 6, which corresponds to a fragment of Fig. 2 near the rear end of the latching pin 54, 60. In this variation, the rear end 56 of the latching pin, instead of being received in a separate cup-shaped guide 58 (as was the case in Fig. 2) simply extends rearwardly into a guide bore in the shutter mechanism plate 14 or the shutter housing 12 itself, as well seen in Fig. 6. The spring 76, as before, tends to move the latching pin axially forwardly. The operation is exactly the same as previously described.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera including an objective shutter unit having an optical axis, an interchangeable lens unit attachable to and detachable from said shutter unit, interengaging means on the two units for securing them detachably to each other, said lens unit having an adjustable diaphragm, a diaphragm aperture adjusting member rotatably mounted on said lens unit, a spring tending to turn said adjusting member in an aperture-reducing direction, a preselection stop member adjustably mounted for controlling the extent to which said spring may turn said adjusting member in an aperture-reducing direction, a latching pin mounted in said shutter unit for limited axial movement, a latch notch in said aperture adjusting member for receiving the end of said latching pin for releasably holding said adjusting member at a maximum aperture position, said latching pin having a spaced shoulder and cam surface, an exposure controlling member mounted on said shutter unit and including a pawl oscillatable about a rotary axis parallel to said optical axis and movable through a predetermined range of travel in one direction to cause an exposure, said pawl engaging said cam surface during a first portion of its said range of travel to retract said latching pin from said latch notch and release said adjusting member for movement in an aperture-reducing direction, pawl means pivoted to said lens unit for engaging said shoulder to prevent further retraction of said latching pin until said adjusting member strikes said preselection stop member, and means for automatically pivoting said pawl means to disengage said shoulder and allow said exposure controlling member to move through the other portion of its said range of travel to cause the exposure.

2. A construction as defined in claim 1 including a pair of arms on said adjusting member, one of said arms being arranged to be externally accessible to be grasped manually to move said adjusting member to said maximum aperture position, said means for pivoting said pawl means being provided by the other of said arms.

References Cited in the file of this patent

UNITED STATES PATENTS

| 2,311,822 | Frankel | Feb. 23, 1943 |
| 2,319,304 | Dalotel | May 18, 1943 |
| 2,371,524 | Kals | Mar. 13, 1945 |
| 2,751,828 | Wirgin | June 26, 1956 |
| 2,777,371 | Schutz | Jan. 15, 1957 |

FOREIGN PATENTS

| 1,106,716 | France | July 27, 1955 |